United States Patent [19]
Oshima et al.

[11] Patent Number: 5,477,839
[45] Date of Patent: Dec. 26, 1995

[54] AIR INTAKE CONTROL SYSTEM FOR SUPERCHARGED ENGINES

[75] Inventors: Tomomi Oshima, Hiroshima; Masao Inoue, Higashihiroshima; Jiro Kondo, Hiroshima, all of Japan

[73] Assignee: Mazda Motor Corporation, Hiroshima, Japan

[21] Appl. No.: 78,892

[22] Filed: Jun. 21, 1993

[30] Foreign Application Priority Data

Jun. 19, 1992 [JP] Japan ........................... 4-161425

[51] Int. Cl.⁶ ................ F02B 29/04; F02B 33/36; F20D 23/02
[52] U.S. Cl. ..................... 123/559.3; 123/563
[58] Field of Search ............... 123/559.3, 563, 123/564, 474

[56] References Cited

U.S. PATENT DOCUMENTS

| | | | |
|---|---|---|---|
| 4,157,084 | 6/1979 | Wallis | 123/474 |
| 4,738,110 | 4/1988 | Tateno | 123/559.3 |
| 4,996,966 | 3/1991 | Hitomi et al. | 123/559.3 |
| 5,119,795 | 6/1992 | Goto et al. | 123/563 |
| 5,269,143 | 12/1993 | Cikanek | 123/563 |

FOREIGN PATENT DOCUMENTS

| | | | |
|---|---|---|---|
| 57-97042 | 6/1982 | Japan | 123/559.3 |
| 63-239312 | 10/1988 | Japan | |

Primary Examiner—Michael Koczo
Attorney, Agent, or Firm—Keck, Mahin & Cate

[57] ABSTRACT

An air intake control system for an engine has intake valves which close at a timing retarded at least 50 degrees from a bottom dead center of an intake stroke. The control system is provided with a mechanical supercharger which is activated while the engine is being cranked.

12 Claims, 3 Drawing Sheets

AIR INTAKE CONTROL SYSTEM FOR SUPERCHARGED ENGINES

BACKGROUND OF THE INVENTION

1. Field of the Invention

This invention relates to a control system for an air intake system for use with or in combination with a supercharged engine, and, more particularly, to an air intake control system for controlling air intake when cranking a supercharged engine.

2. Description of the Related Art

Typically, in order to start a supercharged engine, an air intake control system is used. When cranking a supercharged engine, an air intake system opens an air bypass passage so as to force intake air to bypass a mechanical supercharger 3 (see FIG. 1 for reference only) which is suspended in operation. The air introduced into the bypass passage is directed into cylinders 9 of the engine passing through surge tanks 7 and intake valves 8. This is because, during starting or cranking of the engine with the use of a starter motor, a charging efficiency is more advantageously increased with naturally aspirated air than with the use of the supercharger and, in addition, no load is added to the starter motor from the supercharger.

A supercharging technique, which improves thermal efficiency, and remarkably improves fuel consumption, is described in Japanese Unexamined Patent Publication No.63-239312. Specifically, a supercharged engine described in the above mentioned publication has a geometric compression ratio established at a relatively high ratio of 8.5 or greater and a closing time of an intake valve retarded 50 degrees or greater after the bottom dead center. This supercharged engine can obtain a high expansion ratio while it can appropriately suppress the effective compression ratio of the engine, so that it provides a high resistance to knocking in a high load, high speed range of engine operation in which a large amount of air is supercharged. Further, in the supercharged engine, a drop in temperature of a fuel mixture caused by adiabatic expansion is considerably more as compared with a rise in temperature due to adiabatic compression, so that the temperature of exhaust gas can be dropped without enriching the fuel mixture, thereby improving thermal efficiency and fuel consumption.

However, if a mechanically supercharged engine, in which intake valves close at a timing retarded 50 degrees or more after the bottom dead center, is started while air is naturally aspirated, the air charging efficiency is greatly diminished by means of blowing back of intake air. As a consequence, an insufficient amount of engine torque is caused during the cranking of the engine, so as to render the engine difficult to start because the supercharger has a high mechanical resistance to the engine, in particular, while the engine is still cold.

SUMMARY OF THE INVENTION

It is an object of the present invention to provide an intake air control system which enables easily a cold start of a supercharged engine which closes intake valves at a timing retarded 50 degrees or more from the bottom dead center of an intake stroke.

This object of the present invention is achieved by providing an air intake control system for supercharged engines having intake valves which are closed at a timing retarded 50 degrees or more from the bottom dead center of an intake stroke. The intake air control system is endowed with a mechanical supercharger which is controlled to supercharge air into the engine while the engine is being cranked. Further, the air intake control system is provided with a cold start injector, disposed downstream from the mechanical supercharger, which in turn is activated to inject fuel while the engine is being cranked. Simultaneously, air introduced through the supercharger is directed toward the engine through a bypass passage or line so as to bypass an inter-cooler.

While the engine is being cranked, the air intake control system of the present invention activates the supercharger and the cold start injector, so that with the engine having intake valves which at a timing retarded approximately 50 degrees or more from the bottom dead center of an intake stroke, the air charging ratio is increased with supercharged air higher than that with naturally aspirated air while the engine is being cranked. As a result, while the engine is being cranked, it generates a significantly large amount of torque. This is particularly useful when the engine is still cold and, consequently, is subjected to high mechanical resistance.

Furthermore, while the engine is being cranked, in addition to the activation of the supercharger, the cold start injector is activated to inject fuel into the air intake system. Through the injection of fuel by the cold start injectors disposed just after the supercharger, although the air intake passage or line extends a long way from the cold start injector to the intake valves, the atomization of the injected fuel is adequately accomplished before the intake valves, and there is a measurable improvement in the ignition of fuel within the combustion chambers.

Simultaneously with the activation of the supercharger and the cold start injector while the engine is being cranked, the intake air is introduced through the bypass lines bypassing the inter-cooler. In this manner, a reduction in the volume of intake air, which is caused due to flow resistance when passing through the inter-cooler, is effectively prevented, resulting in a measurable improvement in engine cranking.

BRIEF DESCRIPTION OF THE DRAWINGS

The above and other objects and features of the present invention will be clearly understood from the following detailed description of a preferred embodiment thereof when considering the accompanying drawings, in which.

DESCRIPTION OF THE PREFERRED EMBODIMENT

Figure 1:
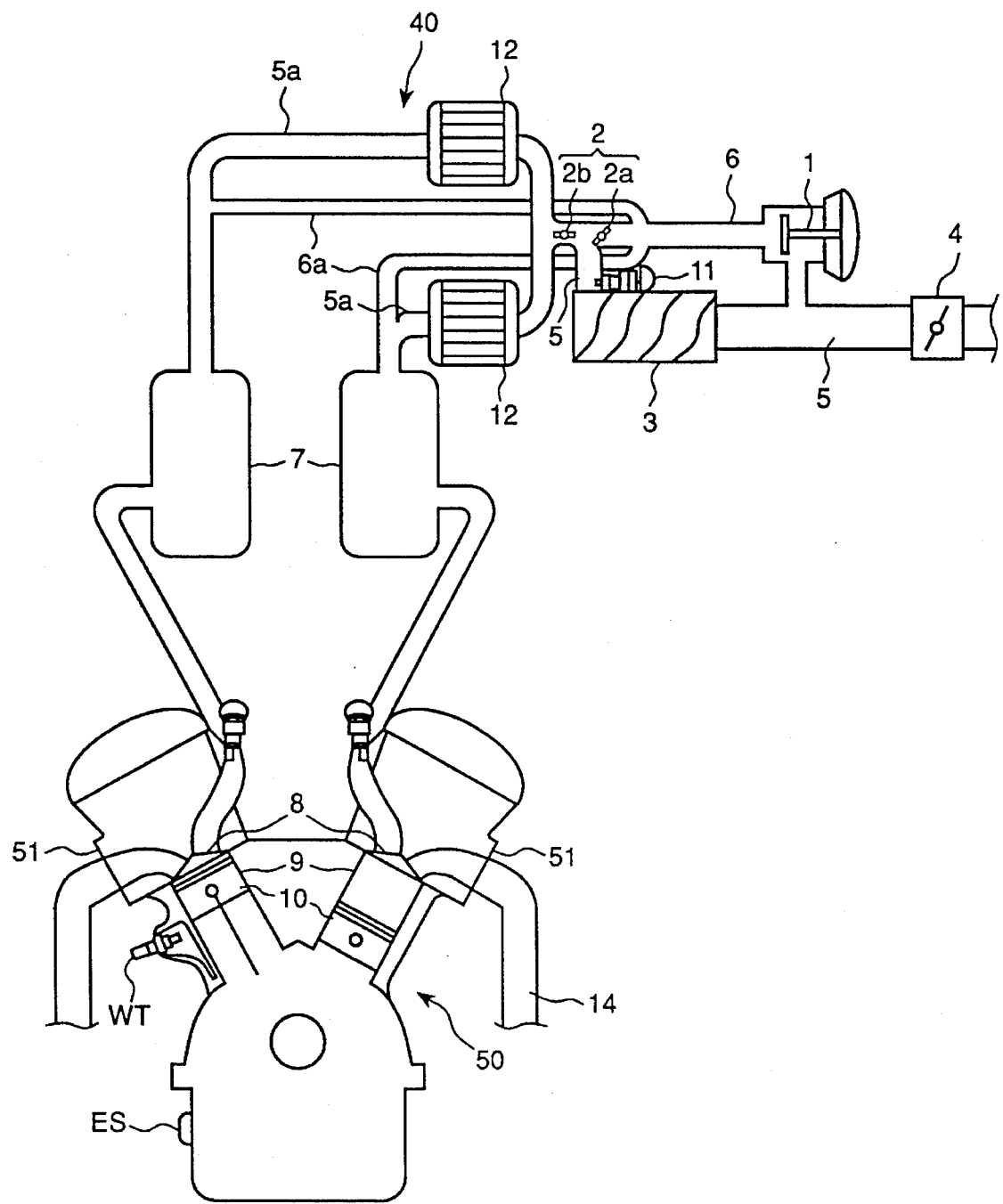
FIG. 1 is a schematic illustration showing an air intake control system for a supercharged engine in accordance with a preferred embodiment of the present invention.

Referring to FIG. 1, an air intake system, generally indicated by a reference numeral 40, in accordance with a preferred embodiment of the present invention, is shown. The system 40 is adapted to be used with a supercharged engine 50 in which intake valves 8 are closed at a timing retarded 50 degrees or more from the bottom dead center of an intake stroke. The air intake system 40 is equipped with a mechanical supercharger 3, disposed in a main or upstream intake line 5, which is controlled in operation by a supercharging control means (which will be described later) to supercharge air into cylinders 9 of the engine 50. The air intake system 40 further includes, in the main intake line 5 provided with throttle valve 4, a pair of intercoolers 12, and a cold start injector 11. The inter-coolers 12 are disposed in downstream or separate intake lines 5a, branching off from the main intake line 5, respectively, and leading to a pair of surge tanks 7 for cylinders 9 of a pair of cylinder banks 51 of the engine 50. Pistons 10 reciprocate in cylinders 9. Exhaust lines 14 lead away from the cylinders 9. The cold start injector 11 is disposed in the main intake line 5 between the supercharger 3 and the inter-coolers 12. The main intake line 5 is provided with an upstream or main bypass line 6 branching off from the main intake line 5 before, or upstream of, the supercharger 3 and leading to the main intake line 5a after, or downstream of, the supercharger 3 so as to allow intake air to bypass the supercharger 3. A pair of downstream or separate bypass lines 6a, branching off from near a downstream end of the main bypass line 6, communicate the main bypass line 6 with the surge tanks 7, respectively, so as to allow intake air to bypass the inter-coolers 12. The air intake system 40 is provided with a primary bypass valve 1 disposed in and near the upstream end of the main bypass line 6 and a secondary bypass valve assembly 2 disposed between the main intake line 5 and the main and separate bypass lines 6 and 6a. Specifically, the secondary bypass valve assembly 2 has first and second valves 2a and 2b, the first valve 2a being disposed between the main intake line 5 after the supercharger 3 and the main bypass line 6 downstream a point from which the separate bypass lines 6a branch off, and the second valve 2b being disposed between the main intake line 5 after the supercharger 3 and the separate intake lines 5a.

Figure 2:
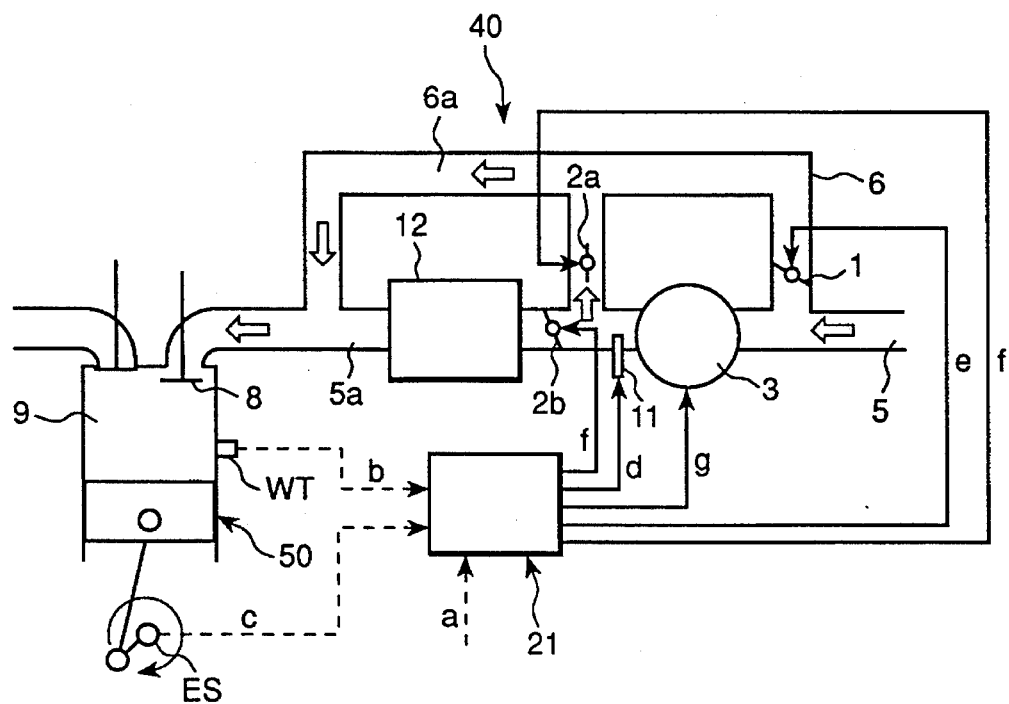
FIG. 2 shows the air intake control system in more detail.
Figure 3:
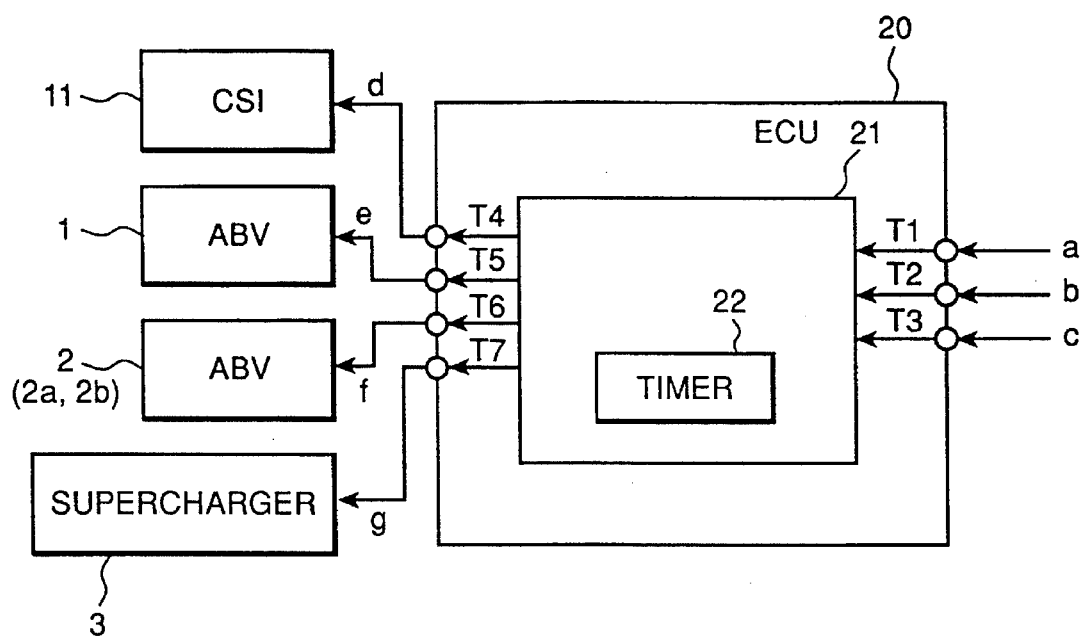
FIG. 3 is a block diagram showing a supercharging control means of the air intake control system shown in FIG. 1.

Referring to FIGS. 2 and 3, wherein the air intake system 40 is shown in more detail and its control means 21 are shown in block diagram, respectively, the control means 21, which has an internal timer 22, is included in an electronic control unit (ECU) 20. The supercharging control means 21 has, as inputs, a signal $\underline{a}$ representative of the impression of a battery voltage to a starter motor (not shown), a signal $\underline{b}$ representative of the temperature of an engine coolant from the temperature sensor WT, and a signal $\underline{c}$ representative of the rotational speed of the engine from a speed sensor ES, through input terminals T1, T2 and T3, respectively. On the basis of these input signals and a count of the internal timer 22, the supercharger control means 21 provides through output terminals T4, T5, T6 and T7, respectively, output signals $\underline{d}$, $\underline{e}$, $\underline{f}$, and g, which are changeable between high (H) and low (L) levels, so as to control the operations of the cold start injector (CSI) 11, the primary bypass valve (ABV) 1, the secondary bypass valve (ABV) assembly 2 and the mechanical supercharger 3, respectively. Signals $\underline{d}$, $\underline{e}$, $\underline{f}$, and $\underline{g}$ held at the high (H) levels cause the cold start injector 11 to be activated, the primary bypass valve 1 to be closed, the first valve 2a to be opened, the second valve 2b to be closed, and the supercharger 3 to be activated, respectively. On the other hand, signals $\underline{d}$, $\underline{e}$, $\underline{f}$, and $\underline{g}$ held at the low (L) levels cause the cold start injector 11 to be deactivated, the primary bypass valve 1 to be opened, the first valve 2a to be closed, the second valve 2b to be opened, and the supercharger 3 to be deactuated, respectively. On the basis of these input signals $\underline{a}$, $\underline{b}$ and $\underline{c}$ and a count of the internal timer 22, the supercharger control means 21 changes these output signals $\underline{d}$, $\underline{e}$, $\underline{f}$ and g between high (H) and low (L) levels so as to activate the supercharger 3 and the cold start injector 11 for specified time intervals, respectively, while the engine is being cranked.

Figure 4:
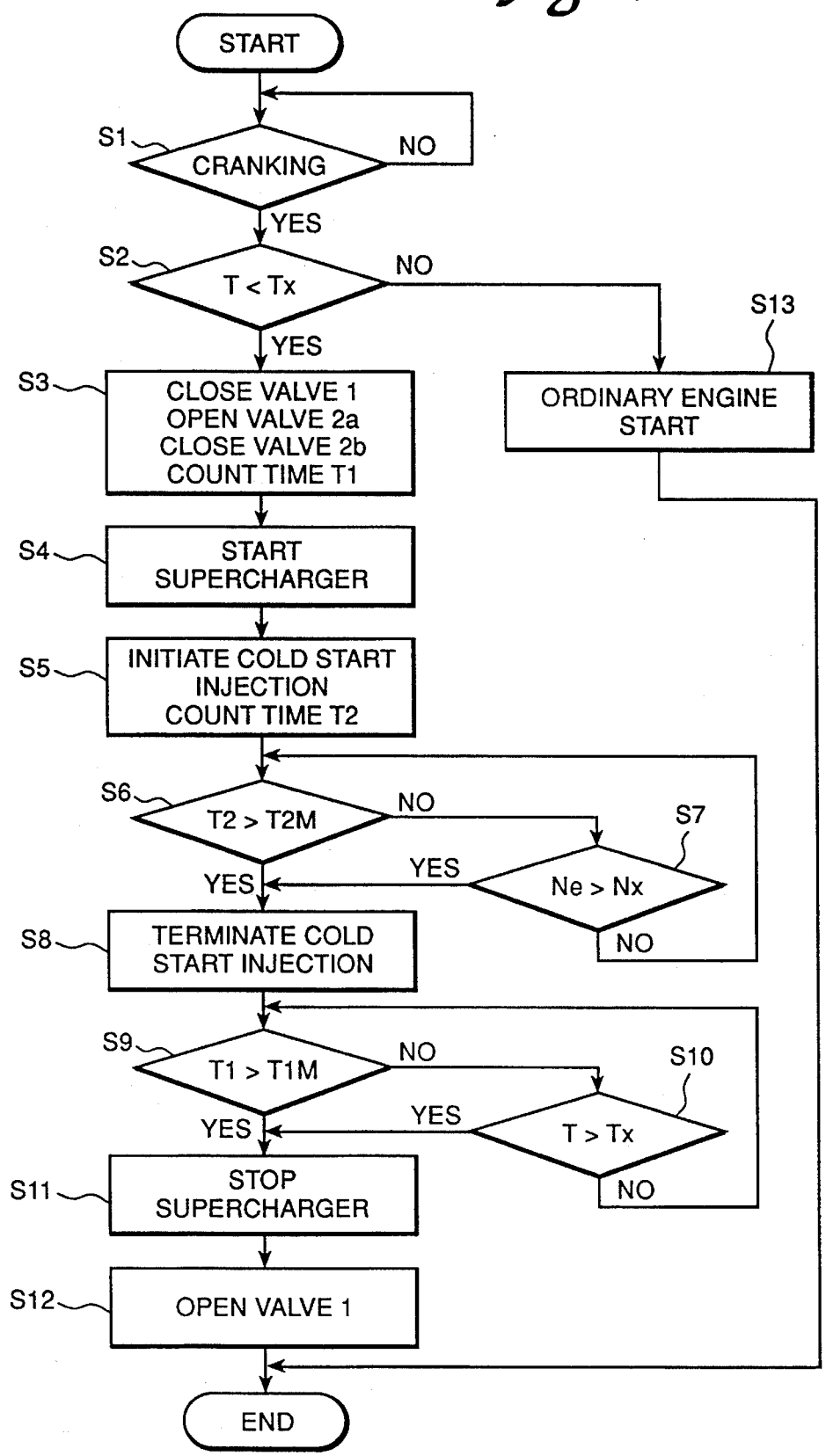
FIG. 4 is a flow chart illustrating a supercharging control.

The operation of the air intake control system depicted in FIG. 2 and the block diagram of FIG. 3 will be clearly understood by reviewing FIG. 4, which is a flow chart of the sequential routine. When the sequence commences, a decision is made based on a starter motor activation signal at step S1 as to whether or not engine cranking has commenced. This decision is repeated if engine cranking has not yet commenced. Following the "YES" answer, a decision is made at step S2 as to whether or not the temperature of engine coolant T is beyond a specified temperature Tx. The engine coolant temperature T is monitored by a water temperature sensor WT.

If the engine coolant is lower than the specified temperature $T_x$, the flowchart logic proceeds to a function block S3. Processes carried out are to close the upstream bypass valve 1 by providing a signal $\underline{e}$ at the high ("H") level at the output terminal T5, to open the bypass valve 2a and close the bypass valve 2b by providing a signal $\underline{f}$ at the high ("H") level at the output terminal T6, and to cause the timer 22 to start counting of a time T1. As a result, air introduced into the air intake system 40 through the throttle valve 4 is directed toward the supercharger 3. Then, a signal g at the high ("H") level is provided at the output terminal T7 so as to activate the supercharger 3 at step S4. The supercharger 3 supercharges the air into the cylinders 9 of the engine 50 through the bypass lines 6 via the surge tanks 7 and the intake valves 8. By means of supercharging air into the engine 50, a sufficient amount of air to start the engine 50 is introduced and charged into the cylinders 9 even through the intake valves 8 which are opened at a timing retarded from the bottom center of an intake stroke. This supercharging is preferable for cold start in which a large amount of torque is required because of high mechanical resistance. Furthermore, forcing air to bypass the inter-coolers 12 through the bypass lines 6a prevents a decline in the amount of air that would otherwise be caused by the inter-coolers 12.

For evaluating air charging ratio when an engine makes a cold starting of the engine, experiments were conducted for various engine speeds such as 300 rpm, 500 rpm and 1,000 rpm. The results are shown in the following Table.

TABLE

| Temp. (C.) | Valve Timing (After BDC) | Super-charge | air charging ratio (%) | | |
|---|---|---|---|---|---|
| | | | 300 rpm | 500 rpm | 1000 rpm |
| −15 | 80 degs. | Not Super-charged | 46 | 50 | 56 |
| −25 | 80 degs. | Super-charged | 70 | 104 | 96 |

As understood from the table, the supercharging ratio is sufficiently increased by supercharging for the cold starting of the engine.

Thereafter, by means of providing a signal $\underline{d}$ at the high (H) level at step S5, the cold start injector 11 is activated to inject fuel. Following the commencement of fuel injection by the cold start injector 11, the timer 22 starts to count a time T2. Since the cold start injector 11 is located at a long distance from the air intake valves 8, fuel is sufficiently atomized and sucked into the engine cylinders 9, so as to be easily ignited in the combustion chambers.

Subsequently, a decision is made at step S6 as to whether or not the timer 22 has counted a specified injection time or interval T2M of, for instance, 10 seconds. If the injection time or interval T2M has not been exceeded, then, a decision is made based on a signal $\underline{c}$ at input terminal T3 at step S7 as to whether or not the speed Ne in rotation of the engine 30 has reached a specified speed Nx of, for instance, 500 rpm. If the answer to either one or the other of the decisions made at steps S6 and S7 is "YES"' this indicates that the fuel has been atomized sufficiently. Then, by means of providing a signal $\underline{d}$ at the low (L) level, the injection of fuel by the cold start injector 11 is terminated at step S8.

Thereafter, a decision is made at step S9 as to whether or not a counted time T1 has reached a specified supercharging time or interval T1M of, for instance, 3 minutes. If the specified supercharging time T1M has not been exceeded, then, a decision is made based on a signal $\underline{b}$ at the input terminal T2 at step S10 as to whether or not the temperature of engine coolant T has reached the specified temperature Tx of, for instance, 50 degrees in centigrade. If the answer to either one or the other of the decisions made at steps S9 and step S10 is "YES"' this indicates that the engine has been brought into condition in which the engine provides a torque sufficient to continuously idle even with naturally aspirated air. Then, after stopping the supercharger 3 in operation by means of providing a signal g at the low (L) level at the terminal T7 at step S11, the bypass valve (ABV) 1 is open at step S12 by means of turning the signal $\underline{e}$ to the low (L) level.

If, at step S2, the temperature of coolant T of the engine has reached the a specified temperature Tx, this indicates that the mechanical resistance of the engine is small and, consequently, the engine is charged with an adequate amount of naturally aspirated air. Then, an ordinary engine start takes place at step S13. In this instance, the term "ordinary engine start" shall mean and refer to an engine start condition in which the engine is started while the supercharger 3 and cold start injector 11 are suspended, and the bypass valve 1 is held open. In the ordinary engine start, the air, introduced into the intake line 5 through the air cleaner (not shown), is directed toward the cylinders 9 passing through the bypass lines 6 via the throttle valve 4, bypass valve 1, surge tanks 7 and intake valves 8.

The inter-coolers 12 and the intake lines 5a after the inter-coolers 12 are used when the engine 30 is brought into a range of operation in which supercharging is necessary. In this supercharging range, hot air, which is created by the supercharger 3, is cooled as it passes through the inter-coolers 12, and is expelled into the intake lines 5a.

According to the present invention, the novel cold starting control as described in detail herein in terms of a specific preferred embodiment is effectively utilized with supercharged engines having intake valves which close at a timing retarded 50 degrees or more, in particular even 70 degrees or more, from the bottom dead center of an intake stroke.

It is to be understood that although the present invention has been described in detail with respect to a preferred embodiment thereof, various other embodiments and variants may occur to those skilled in the art. Such other embodiments and variants are deemed to fall within the scope and spirit of the invention and are intended to be covered by the following claims.

What is claimed is:

1. In combination, an internal combustion engine, having intake valves which close at a timing retarded at least 50 degrees from a bottom dead center of an intake stroke and a fuel injector disposed in an intake line, and an air intake control system for said internal combustion engine, said air intake control system comprising:

a mechanical supercharger for supercharging air supplied to the internal combustion engine; and supercharging control means for causing said mechanical supercharger to be driven while said internal combustion engine is being cranked.

2. A combination as defined in claim 1, wherein said supercharging control means causes said mechanical supercharger to be driven while said internal combustion engine is still cold and is being cranked at temperatures lower than a specified temperature.

3. A combination as defined in claim 2, and further comprising a temperature sensor for detecting a temperature of said internal combustion engine and providing a drive signal to said supercharging control means when detecting temperatures lower than said specified temperature.

4. A combination as defined in claim 3, wherein said supercharging control means causes said mechanical supercharger to be driven upon receipt of said drive signal when said internal combustion engine is being cranked.

5. A combination as defined in claim 4, wherein said supercharging control means includes a timer for counting a specified supercharging time interval for which said mechanical supercharger is caused to be driven.

6. In combination, an internal combustion engine, having intake valves which close at a timing retarded at least 50 degrees from a bottom dead center of an intake stroke and a fuel injector disposed in an intake line, and an air intake control system for said internal combustion engine, said air intake control system comprising:

a mechanical supercharger for supercharging air supplied to the internal combustion engine;

a cold start injector disposed between said mechanical supercharger and said internal combustion engine for injecting fuel into said intake line; and supercharging control means for causing said mechanical supercharger to be driven and said cold start injector to inject fuel while said internal combustion engine is being cranked.

7. A combination as defined in claim 6, wherein said supercharging control means causes said mechanical supercharger to be driven while said internal combustion engine is still cold and is being cranked at temperatures lower than a specified temperature.

8. A combination as defined in claim 7, and further comprising a temperature sensor for detecting a temperature of said internal combustion engine and providing a drive signal to said supercharging control means when detecting temperatures lower than said specified temperature.

9. A combination as defined in claim 8, wherein said supercharging control means causes said mechanical supercharger to be driven upon receipt of said drive signal when said internal combustion engine is being cranked.

10. A combination as defined in claim 9, wherein said supercharging control means includes a timer for counting a specified supercharging time interval for which said mechanical supercharger is caused to be driven.

11. A combination as defined in claim 9, wherein said supercharging control means includes a timer for counting a specified time for which said cold start injector is caused to inject fuel.

12. In combination, an air intake control system and an internal combustion engine, having intake valves which close at a timing retarded at least 50 degrees from a bottom dead center of an intake stroke and a fuel injector disposed in an intake line, said air intake control system comprising:

a mechanical supercharger disposed in said intake line for supercharging air into the internal combustion engine;

an intercooler disposed in said intake line between said mechanical supercharger and said internal combustion engine for cooling intake air;

bypass means for forcing intake air to bypass said intercooler;

a cold start injector disposed between said mechanical supercharger and said internal combustion engine for injecting fuel into said intake line; and supercharging control means for causing said mechanical supercharger to be driven, said cold start injector to inject fuel and said bypass means to force intake air to bypass said intercooler while said internal combustion engine is being cranked.

* * * * *